Sept. 3, 1957  J. F. LA PLANTE ET AL  2,804,981
APPARATUS FOR SUPPLYING BATCH MATERIALS TO A GLASS FURNACE
Filed Oct. 24, 1952  4 Sheets-Sheet 1
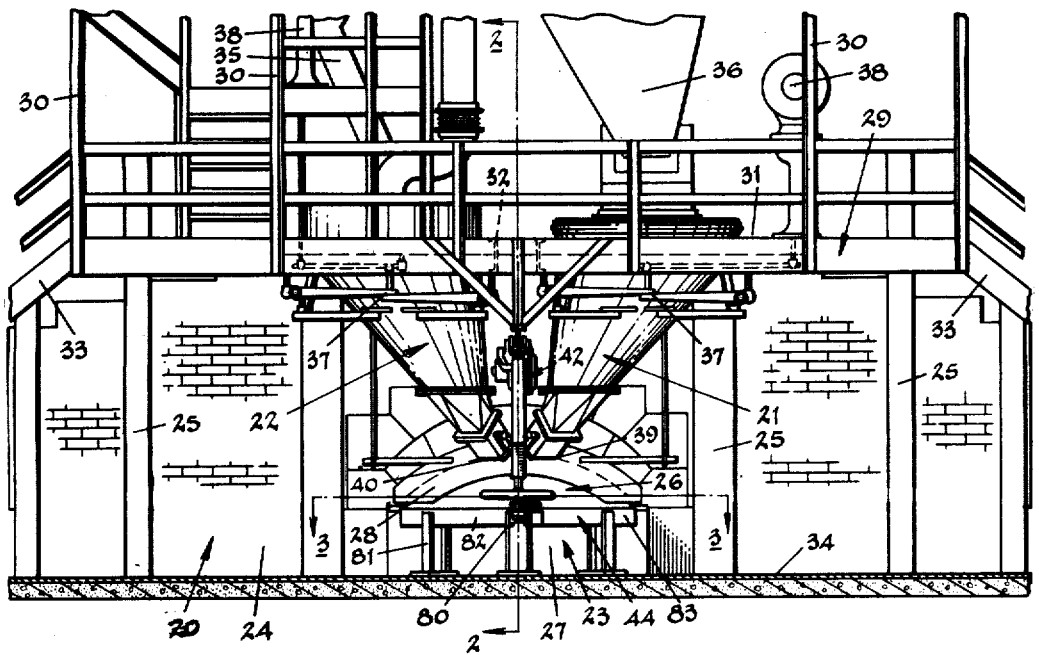
Fig. 1
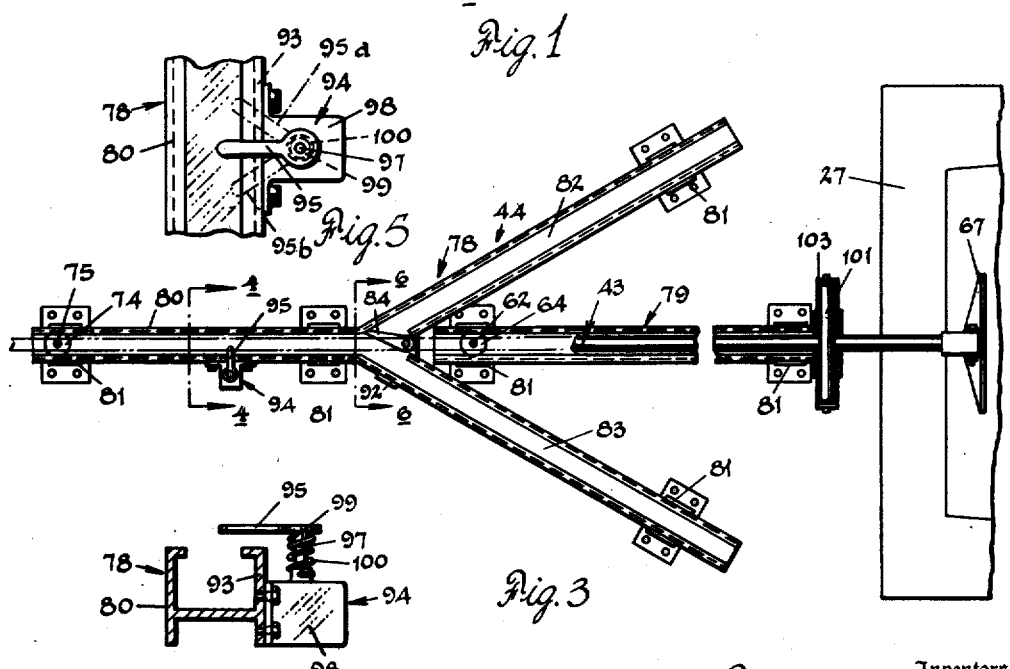
Fig. 5
Fig. 3
Fig. 4
Inventors
James F. La Plante and
Delmar E. Carney
By Nobbe & Swope
Attorneys

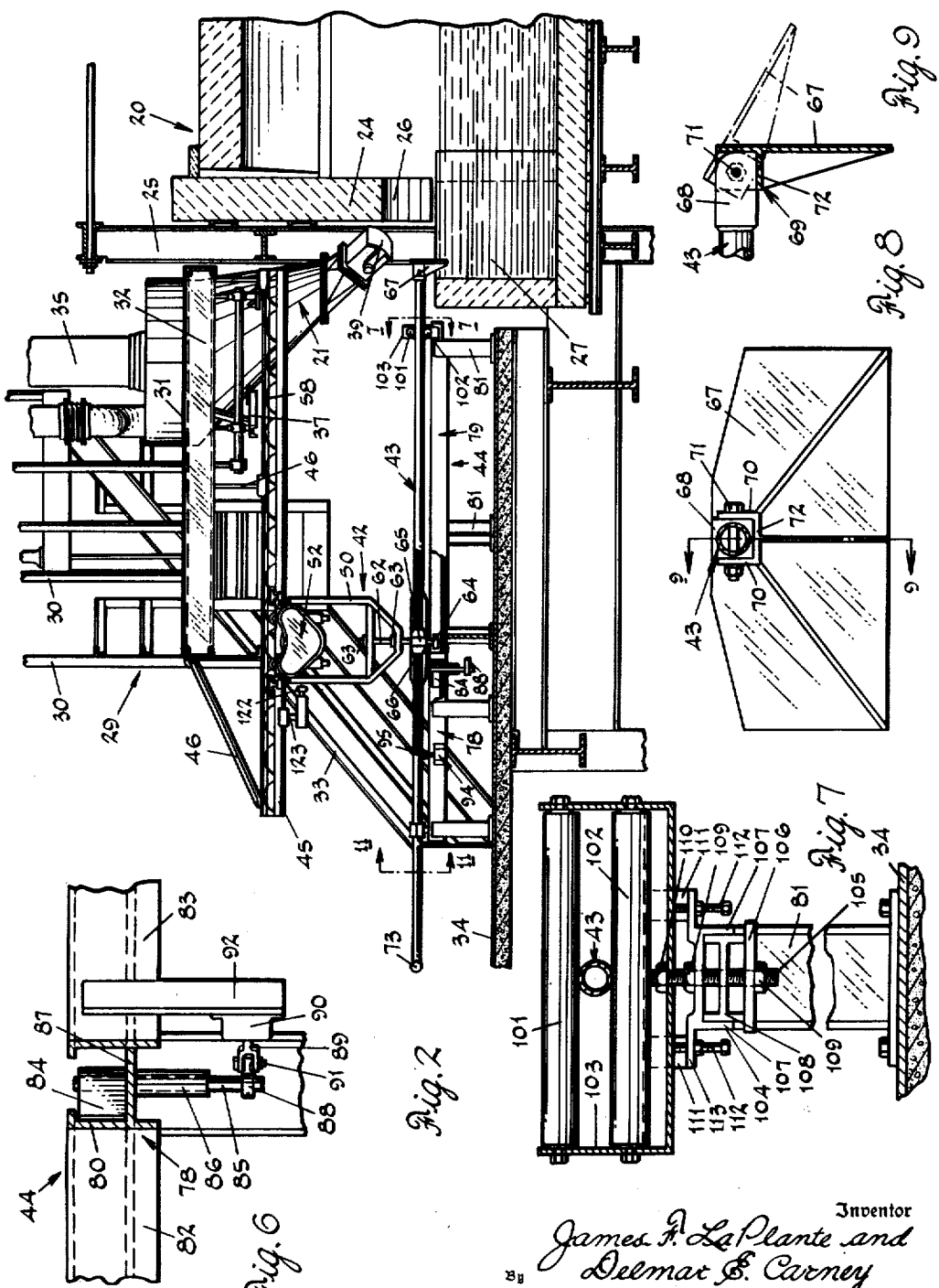

Inventors
James F. LaPlante and
Delmar E. Carney
Nobbe & Swope
Attorneys

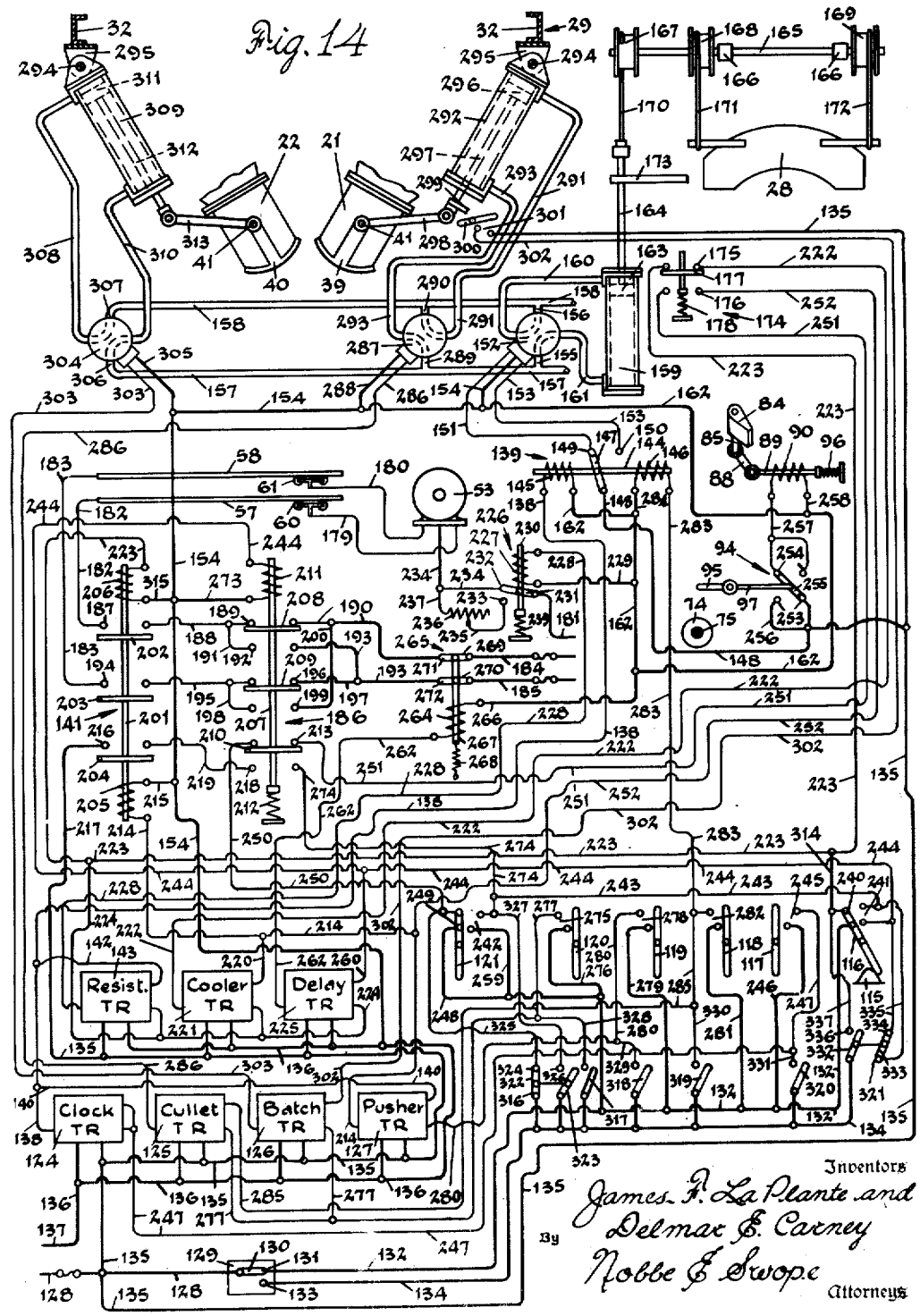

2,804,981

Patented Sept. 3, 1957

2,804,981

APPARATUS FOR SUPPLYING BATCH MATERIALS TO A GLASS FURNACE

James F. La Plante and Delmar E. Carney, Toledo, Ohio, assignors to Libbey-Owens-Ford Glass Company, Toledo, Ohio, a corporation of Ohio Application October 24, 1952, Serial No. 316,572

12 Claims. (Cl. 214—23)

The present invention relates broadly to the supplying of batch materials to melting tanks. More particularly, it has to do with an improved apparatus for attaining a more rapid and thorough melt of glass at a constant level by introducing the batch materials across the surface of the molten glass in the glass tank-furnace into predetermined locations in a definite sequence and at regularly spaced intervals.

An important object of this invention is to supply glass batch materials to a tank-furnace in relatively small quantities and then distribute them over a large surface area of the molten glass contained in such a furnace without causing surging action of the already molten glass.

Another object of the invention is to supply glass batch materials at regularly spaced intervals to one area of a tank-furnace and then to another area of the tank-furnace; to automatically determine the amount of batch material to be supplied; and to move it into the tank-furnace in an alternating sequence of operation.

Another object of the invention is to more effectively expose the glass batch materials to the heat of the tank-furnace.

Another object of the invention is to provide a novel, automatically operating pusher apparatus for moving glass batch materials into a tank-furnace, directing the materials laterally into the body of molten glass therein and distributing said materials across the surface of the molten glass in readily reducible quantities.

Another object of the invention is to provide, in a batch pusher apparatus of the above character, a control means whereby the apparatus will move batch materials, introduced into a glass tank-furnace, into designated areas of the said furnace, the areas being disposed substantially along opposite sides of the tank-furnace.

Another object of the invention is to provide, in a batch pusher apparatus of the above character. A control means whereby the apparatus will be caused to move discharged glass batch materials into a tank-furnace, direct the batch materials laterally into the body of molten glass therein and distribute such batch materials into areas of the molten glass in alternating sequences toward one side and then the other side of the tank-furnace.

Still another object of the invention is to provide a novel control system for a batch pusher apparatus of the above character whereby the component materials of a glass batch will be discharged into the glass tank-furnace in sequence and at regularly spaced intervals; the glass batch will be moved laterally into the body of molten glass toward one side of the furnace in suitable distribution and the pusher apparatus will be subsequently operated to move a later discharged batch laterally toward and into an opposite side area of the furnace.

Other objects and advantages of the invention will become more apparent during the course of the following description when read in connection with the accompanying drawings.

In the drawings, wherein like numerals are employed to designate like parts throughout the same:

Fig. 1 is an end elevation of a conventional tank-furnace used for the melting of glass and of a glass batch pushing apparatus constructed in accordance with the invention;

Fig. 2 is a fragmentary vertical, longitudinal sectional view taken substantially on the line 2—2 of Fig. 1;

Fig. 3 is a plan view of the guide tracks of the batch pushing apparatus, taken substantially along the line 3—3 of Fig. 1;

Fig. 4 is a vertical, transverse sectional view taken on line 4—4 of Fig. 3, illustrating a control device of the batch pushing apparatus;

Fig. 5 is a top or plan view of the control device shown in Fig. 4;

Fig. 6 is a vertical, transverse, sectional view of the guide track, taken on line 6—6 of Fig. 3;

Fig. 7 is a vertical detail view of the roller support of the batch pushing apparatus taken on line 7—7 of Fig. 2;

Fig. 8 is a detail view of the glass batch pushing blade;

Fig. 9 is a sectional detail view of the blade, taken on line 9—9 of Fig. 8;

Fig. 14 is a schematic view of the electric and pneumatic systems of the glass batch pushing apparatus.

Figure 10:
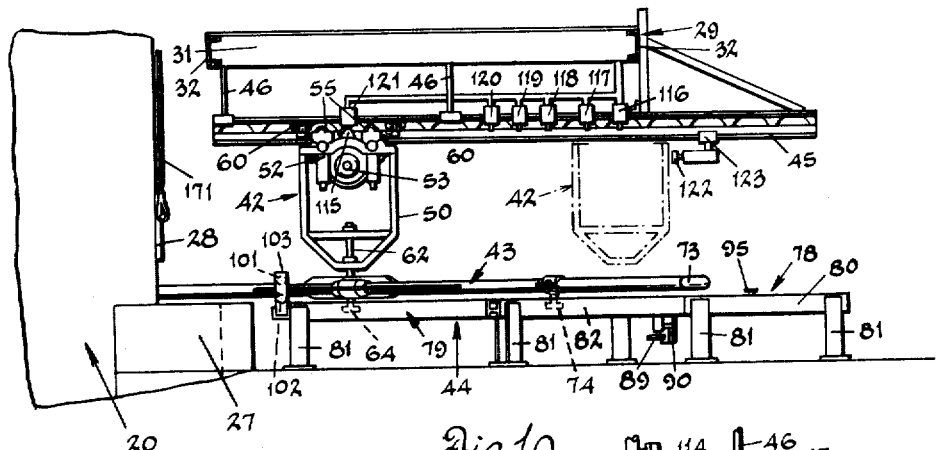
Fig. 10 is a side elevation of the glass batch pushing apparatus when viewed in the opposite direction from Fig. 2.

In the production of sheet or plate glass, according to the conventional "continuous" process, the materials going to make up the glass batch are periodically discharged into the glass tank-furnace at what is commonly termed the "dog-house" in the charging end of the tank. The dog-house is actually a relatively small bay projecting outwardly from the wall of the tank-furnace and having communication with the interior or body thereof through an aperture or the so-called "dog-house arch." Batch materials are thus discharged into the dog-house, gradually introduced into the body of already molten glass in the tank to melt and become a part thereof and maintain a constant supply for the drawing-off of glass from the opposite or exit end of the tank-furnace.

However, it is important, in adding the batch materials, that they neither be moved into the molten glass in a manner to cause surging within the tank-furnace nor isolated so that they are reduced to or remain in slow melting lumps. In order that the constant supply or level of the molten glass be maintained at the optimum, it has therefore been found advantageous to supply the batch materials in relatively small quantities and to discharge these quantities at more closely spaced intervals.

We have also found that if the batch materials, when so supplied, are moved toward a side of the tank-furnace they will be distributed evenly over one area or another of the molten glass, and, being of a smaller quantity, will be more readily melted.

In the making of glass, it is customary to use a batch including some raw batch material and some cullet, which is either scrap-glass gathered from other glass-working operations or glass that has been particularly prepared for this purpose. The raw materials are intermixed in desired proportions and are stored in a large hopper arranged above the charging end of the tank while the glass cullet is stored in a similar hopper in the same general vicinity.

Chutes are connected to the lower ends of the hoppers so that they will direct the raw batch material or cullet glass from their respective hoppers into the dog-house of the tank. Preferably the chutes are constructed so that measured quantities of the batch may be discharged at regularly spaced intervals to replace the glass drawn continuously from the exit end of the tank-furnace.

The releasing or discharging of the required quantities of batch materials at desired intervals and, more especially, their proper entry into the body of the tank has, heretofore, required a great deal of accurate control and manual labor. And the operators have been forced to work the materials into the tank under conditions that are uncomfortably hot, if not dangerous to the health of the individuals.

With this invention however, the measured quantities of the cullet glass and of the raw batch materials are discharged into the dog-house of the glass tank-furnace at regularly spaced intervals and, more particularly, a relatively small quantity of the materials is moved from the dog-house into the body of the tank-furnace according to a regular schedule so that they will be evenly distributed into the molten glass across the width of the tank. Since the quantity of batch materials thus supplied is substantially smaller than that heretofore added, its movement in the molten glass reduces the tendency of the melting glass to surge and at the same time a manner of distribution is obtained which renders the materials more susceptible to the furnace heat. Moreover, a timed sequence is effected for the discharge of the components of the glass batch into the tank and for their distribution generally across the width thereof to the end that introduction of the batch into the molten glass is continuously and equally made and without isolation of the batch into any one area.

Referring now to the drawings, for a more detailed description of the invention, there is shown in Fig. 1 the rear wall of a glass-melting tank-furnace, generally designated 20, glass batch supplying chutes 21 and 22 and the glass batch pushing apparatus, generally designated 23. The wall 24 of glass tank-furnace 20, forming the charging end of the tank, is reenforced in the usual manner by structural members, or so-called "buck-stays" 25 and is provided with an opening or dog-house arch 26 through which the dog-house 27 communicates with the body or interior of the tank-furnace 20. The arch 26, above the area of the dog-house 27, is substantially closed by a movable, vertically disposed plate 28, commonly termed and hereinafter described as a "cooler"; its function being to close off and restrict the egress of high heat and gases from the tank.

In front of the tank-furnace and superimposed above the dog-house 27 is an elevated structure or platform 29 from which the chutes 21 and 22 are suspended. The platform 29 may be considered a part of the general framing structure of the building in which the tank-furnace 20 is situated and is carried from the roof girders and like members by such beams as are indicated at 30. The platform includes a floor 31 mounted on horizontally disposed channel members 32 and also stairways 33 by which access may be had to the platform from the factory floor 34.

Arranged on and extending downwardly through the floor 31 are conventionally constructed chambers that supply the chutes 21 and 22 from the overhead hoppers into which the cullet and raw batch materials are initially dumped. More particularly, the cullet is directed through a communicating chute 35 into the supply chute 21 while the raw batch materials are directed to the supply chute 22 through a communicating chute 36.

Arranged with the chutes 21 and 22 are the actuated elements of weighing devices which operate, through conventional beam structures 37, to indicate the weights of materials in said chutes by means of scales 38. Preferably the capacities of the chutes 21 and 22 are large enough to hold sufficient amounts of the raw batch or cullet so that, on a regular production operation, several partial discharges may be made by automatic control devices before it becomes necessary to replenish either of the chutes.

Each supply chute, 21 or 22, is conventionally equipped with a convergently-formed, funnel-like end that is closed at its lower extremity as by the gates 39 and 40. While not shown, except diagrammatically in Fig. 14, it is to be understood that these gates 39 and 40 are each pivotally hung on the walls of the funnel-like chute ends by stub shafts 41 and are adapted to be operated by pneumatically actuated levers, as will be more fully hereinafter described, to open and close the discharge ends of the chutes. The gates 39 and 40 are preferably operated in a sequential order in which the gate 39 of the chute 21 is swung from the lower end thereof to discharge a quantity of the cullet into the dog-house 27; after which, the gate 40, associated with chute 22, is operated in like manner to discharge the required amount of raw batch material. After the elapse of a predeterminedly timed interval, the cooler 28 is raised and the batch pushing apparatus 23 operates to cause movement of the deposited batch materials from the dog-house into the body of the tank-furnace. The action of this apparatus is such that during each sequential cycle of pushing operation the charge of batch materials will be moved into an opposite area of the tank-furnace than that area into which the preceding charge had been directed. In other words, the apparatus is caused to function in an automatic manner so as to first push a discharged amount of batch materials to the right from the dog-house into the tank-furnace, then to the left, again to the right and so on.

Figure 12:
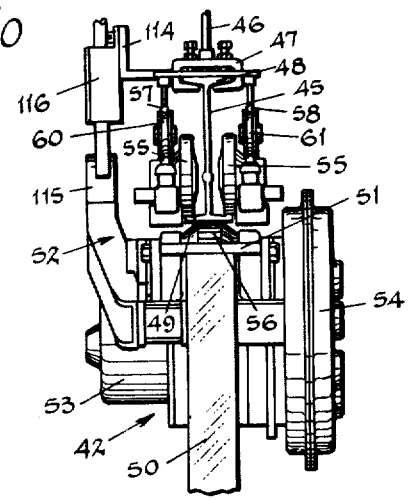
Fig. 12 is an end view of the conveyor for the glass batch pusher.

The batch pushing apparatus 23 comprises generally a conveyor 42, a pusher bar 43 carried thereon and a guide track 44. As best shown in Figs. 2 and 12, the conveyor 42 is carried by a so-called tram-rail 45 that is secured to and suspended from the platform 29 by braces 46. More particularly, as shown in Fig. 12, the tram-rail 45 is substantially of I beam form and the braces 46 are secured by clamps 47 to the upper flange 48 while the lower flange 49 serves as the actual support for the conveyor.

The conveyor, per se, includes a frame 50 that is secured at its upper ends to the horizontally disposed attaching lugs 51 of a conventional tram device which may be one of any of the commercially well-known makes. While forming no part of this invention, the type herein disclosed for purposes of illustration includes a frame 52 on which is mounted a reversible motor 53, an encased gear train 54, suitable supporting casters 55 and drive rollers 56. The casters 55 ride on the upper surface of the lower flange 49 of rail 45 while the drive rollers 56 actively engage the under-surface of said flange to propel the conveyor 42, in its entirety, along the rail 45. To furnish power for the motor 53, the rail 45 constitutes one bus bar or conductor while suitable conductor rods 57 and 58 are located in parallel relation along the opposite sides of the rail 45 and are suspended by insulated brackets 59 from the upper flange 48 thereof and electrical current is taken from the conductor rods in the well-known manner, as by pairs of roll-type contacts 60 and 61. These are arranged on opposite sides of the frame 52 and, since the motor 53 is reversible in character, the power supply thereof through the conductor rods 57 and 58 may be reversed to change the phase relation of the motor in alternating sequences to propel the conveyor 42 forwardly and rearwardly on the rail 45.

At the lower end of the conveyor frame 50, a shaft 62 is vertically supported and journaled in bearings 63. The shaft 62 extends through and is rigidly secured to the pusher bar 43. At its lowermost extremity, the shaft 62 carries a roller 64 which can be rotatably attached thereto in any suitable manner.

The pusher bar 43 may be formed by suitable metal tubing. If desired, the juncture between the shaft 62 and said bar may be reenforced by a suitable integrally welded sleeve 65 while longitudinally disposed ribs 66 may be located along the bar for similar purposes. The bar, at one or its forward end, is equipped with a pivotally attached rabble or blade 67 by which the batch materials are moved. As shown in Figs 8 and 9, the bar 43 has a block 68 secured at its end through which a horizontal cross-hole is made. Secured on the rear surface of the blade 67 is a U-shaped bracket 69, the upwardly directed legs 70 of which have openings for receiving a pintle pin 71 when the same is inserted through the cross-hole of the block 68. The blade 67 is thus supported on the end of the bar 43 but, by reason of the relation of the horizontally disposed web 72 of bracket 69 to the block, rotation of the blade is restricted to motion in one direction and it will normally be restrained in a substantially vertical position as is shown in Fig. 9. This assures a rigid vertical positioning of the blade as it is caused to push the glass batch material, but permits the rabble or blade to swing upwardly and outwardly, as shown in broken line, as it is withdrawn from the interior of the tank and thereby ride freely over the surface of the batch as it separates therefrom. At the opposite or rear end of the bar, a handle 73 is provided for emergency manual use.

Figure 11:
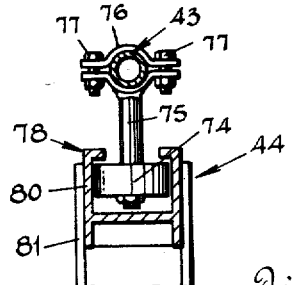
Fig. 11 is a sectional detail view of the guide track, taken on line 11—11 of Fig. 2.

As the pusher bar 43 is carried toward and away from the glass tank-furnace 20 by movement of the conveyor 42 along the tram-rail 45, it is caused to swing in a definite course of radial motion whereby it describes a partially straight and partially radial sweeping direction of movement. This action by the pusher bar is produced and controlled by the cooperation of a roller 74 carried by the bar 43 with the guide track 44. The roller 74, as shown in Fig. 11, is rotatably attached to the lower end of a rod 75 secured to the lower half of a saddle clamp 76 encircling the bar 43 and rigidly connected thereto by bolts and nuts 77.

As best seen in Fig. 3, the guide track 44 consists of a Y-shaped track section 78 and a straight track section 79 which is aligned with the leg 80 of the Y-shaped section so that both are located in line with the longitudinal axis of the glass tank-furnace. The track sections 78 and 79 are each supported by similarly formed standards 81 on the floor 34 of the tank building. The track sections 78 and 79 are arranged so that the centrally disposed roller 64 on shaft 62 will traverse the straight track section 79 while the roller 74 will traverse the straight leg 80 of the Y-shaped track section 78 and either of the divergently disposed arm sections 82 or 83 thereof. Thus as the conveyor 42 is propelled forwardly on the tram-rail 45, the roller 74 will move along the confines of the leg section 80 until it enters one or the other of the arm sections 82 or 83 and, during this movement, the roller 64 will be moving along within the confines of the straight track section 79. However, when the roller 74 enters one of the arm track sections, it produces an angular motion of the pusher bar 43 from its straightaway course and consequently it will swing radially on the shaft 62, the shaft 62 and roller 64 functioning as the pivot point. This causes the rabble or blade 67, entering the tank-furnace through the dog-house arch 26, to push the batch material in a longitudinally straight direction and then radially swing the same laterally in a sweeping arc toward one side or the other of the tank-furnace. Naturally when the conveyor 42 is caused to move rearwardly, the roller 74 reverses its motion in one or the other of the arm track sections and produces a withdrawing action of the bar 43 and blade 67 so that they will swing and finally complete their withdrawal in a straight course of motion.

Entry of the roller 74 into either of the divergent arm track sections 82 and 83 is controlled by a switch-frog or gate 84 that is located in the crotch formed at the point of junction of said sections 82 and 83. The gate 84 is mounted on a vertically supported shaft 85 that is journaled in a sleeve 86 secured to the web 87 of the track.

As best seen in Fig. 6, the shaft 85 carries a lever 88 at its lower end and this lever is pivotally connected to the armature 89 of a solenoid 90 by a suitable coupling 91. The solenoid may be mounted on a vertically disposed plate 92 secured to the wall 93 of the track section 83.

In order that the gate 84 may be caused to direct the roller 74 alternately into the arm track section 82 and then the arm track section 83, a conventional ratchet-type switch 94 is disposed along and secured to the wall 93 of the leg track section 80 and is equipped with an actuating lever 95 that is interposed in the path of travel of the rod 75 carrying the roller 74. Preferably the switch 94 is of the rotary "on-off" ratchet character so that by its operation to complete a circuit therethrough in alternating sequences, the armature 89 will be caused to move inwardly with respect to the solenoid 90. When the switch is operated to open the circuit, a spring 96 associated with the armature 89 will cause said armature to move outwardly with respect to the coil 90. This will similarly cause the gate 84 to be swung to its alternate position but, by reason of the operation of the lever 95 of switch 93 by the rod 75, this does not occur until after the conveyor 42 has resumed its forward motion in a subsequent cycle of operation. Thus, upon referring to Fig. 3, and with the pusher bar 43 in its rearmost position, as the roller 74 is carried forwardly along the leg section 80 of the track section 78, it will apparently be directed into the arm track section 83; however, as the roller 74 and rod 75 engage and pass the lever 95, the movable element of switch 94 will be moved to render the solenoid 90 inoperative which will allow the spring 96 (Fig. 14) to move the armature 89 thereof outwardly and swing the lever 88 and gate 84 until communication between the leg 80 and arm 82 of the track section 78 is opened. When the pusher rod 43 is moved rearwardly by conveyor 42, the roller 74 will be carried rearwardly along the track section 82 into the leg section 80 and past the lever 95. The lever 95, however, is mounted so that it is effective to operate the switch 94 only when turned in one direction and consequently there will be no ensuing operation of the solenoid 90.

One form of such construction is set forth in Fig. 4 wherein it will be noted that lever 95 is carried on a vertical shaft 97 secured in the top of the switch case 98. The lever has a hub portion 99. Between the hub 99 and the case 98, a light coil-spring 100 is connected with one end affixed to said base and the opposite end affixed to the hub 99. By means of this arrangement, the lever, when being swung from the full line position to the broken line position 95a, will actuate the ratchet elements of switch 94 and then be returned to the full line position by the spring 100. When, however, the pusher bar is moving rearwardly, the bar 75 will engage and swing the lever 95 to the second broken line position 95b and no engagement will be effected to operate the switch.

As will be seen from Fig. 2, the pusher bar is more or less a freely suspended member and that it is of considerable length outwardly from the shaft 62 in each direction. In order that it will be as freely movable as it is suspended, the forward end of the bar is supported between bearing rolls 101 and 102. These rolls, as shown in Fig. 7, are pivotally carried in a frame 103 that is mounted in a bracket 104. The frame and bracket are interconnected by a centrally disposed bolt 105 which is positioned in the frame, the bracket and a clamping plate 106. The bracket is provided with downwardly directed legs 107 so that an extended portion 108 of the track section 79 may be received therebetween. Nuts 109 are threaded onto the bolt 105 above the bracket 104 and beneath clamping plate 106 to rigidly affix the same to the extended portion 108. The nut 110 on bolt 105 will then secure the frame 103 on the bracket. To prevent horizontal angular movement of the frame, the bracket may be provided with upwardly directed lugs 111 while adjustment of the frame to locate the rollers 101 and 102 in a horizontal plane may be effected by means of set screws 112 threaded through the ends 113 of the bracket and brought up tightly against the frame.

The sequentially occurring operations of the pushing apparatus 23 are initiated and caused to effect automatic operation by limit switches that are arranged in the path of the conveyor 42 and consequently are actuated as it moves forwardly and rearwardly. Preferably, in such an exemplary system of limit switches, one outer switch will operate to reverse the movement of the conveyor as when it is moving in a forward direction and the opposite outer switch operates to stop movement of the conveyor at the desired limit of its rearward travel. Between these terminal controls, other switches have been located to carry out a cycle of operation of the pusher apparatus. That is to say—as the conveyor 42 begins to move the pusher bar 43 forwardly, a cycle timing relay is "re-set" and the cooler 28 is raised to expose the major area of the dog-house arch 26 in the tank wall 24. Then, as the pusher bar is carried rearwardly, certain other switches are progressively operated to re-set a subsequent timed cycle for the discharge of the batch materials; to re-set a similarly timed cycle for the preliminary operation of the conveyor 42, and lastly, to lower the cooler 28 when and as the blade 67 of the pusher bar 43 has returned to its original position relative to the dog-house 27.

These above-mentioned switches are arranged in the path of travel of the conveyor 42 and are of a conventional character of limit switch that is constructed to operate upon the actuation thereof by a control member when said member is moving in one direction and to remain inoperative when again passed by the control member when it is moving in the opposite direction. More particularly, the switches are carried by brackets 114 secured to the upper flange 48 of the tram-rail 45 (Fig. 12). And for this purpose, the conveyor frame 52 has mounted thereon a cam or control member 115. Thus the outwardly disposed double-action switch 116 is adapted to operate when the conveyor 42 is returning rearwardly; the switch 117 to operate when the conveyor is moving forwardly; the switches 118, 119 and 120 operate when the conveyor is moving rearwardly, and switch 121 to operate when the conveyor is moving forwardly.

First, in this sequential order, the conveyor 42 moves forwardly and carries the cam 115 from engagement with switch 116 which is adapted in one position to halt rearward movement of the conveyor. The cam 115 then engages the arm of the switch 117 to close the same and thereby re-setting the cycle or clock timing relay. It then passes the arm of switch 118 without operating the same since this switch controls subsequent lowering of cooler 28. The switches 119 and 120 are connected into the circuits of certain timing relays that are instrumental in setting up other predetermined time cycles of the operation and are inoperative during forward movement of the cam 115 therepast. The switch 121 is disposed at the end of the forward movement of the conveyor 42 and accordingly is actuated by the cam 115 to initiate a change in the phase relation within the motor 53 so that it will produce rearward motion of the conveyor.

During such rearward movement, the cam 115 will cause switches 120, 119 and 118 to function, will figuratively by-pass switch 117 and will engage the arm of switch 116 to cause opening of the circuits of the motor 53 and halt further movement thereof. If desired, a spring-loaded bumper 122 may be carried by a bracket 123 from the tram-rail 45 to ease or "brake" the conveyor's motion.

In order that one cycle of operation can be simply followed through in sequence with the requisite functioning of the necessary switches and valves, reference is now made to Fig. 14 wherein an exemplary form of electrical circuits and pneumatic systems has been combined in diagrammatic representation. A predeterminedly timed sequence for each operative cycle is, by way of illustration, controlled by timing relays, such as are indicated at 124 (Clock TR); 125 (Cullet TR); 126 (Batch TR) and 127 (Pusher TR). Operation of the relay 124 is effected by the cam 115 on the conveyor 42 while the same is traversing the tram-rail 45 in a forward direction; while the relays 125, 126 and 127 are actuated during rearward motion of the conveyor 42. The Clock relay 124 thus constitutes the master control instrument wherein the cycles of automatically repetitive operations are set up. That is to say—a predeterminedly timed interval as, for example, of five or seven minutes between repetitive operations of the pusher apparatus 23 may be controlled by adjustment of the Clock relay 124, and the relay will be re-set and activated during forward movement of the conveyor 42 while the relays 125 and 127 will be functionally re-set in a similar manner during rearward motion of the conveyor.

Thus, during the initial forward movement of the conveyor 42, and when the cam 115 engages the limit switch 117, circuits will be established to the relay 124 whereby it will be re-set and a repeating cycle will be simultaneously instituted after an elapse of the predetermined time interval. By way of example, the overall batch requirements for the tank-furnace 20 may be such that a portion of the cullet glass in the chute 21 and the raw batch materials in the chute 22 should be sequentially discharged at the end of a five or seven minute interval. The Clock timing relay 124 will accordingly be predeterminedly set for such a period as may be desired and, during the interim the Cullet and Batch relays 125 and 126 will function to discharge the required amount of batch after the Pusher relay 127 has ceased to function. The period of inactivity will thus occur between the dumping of the batch materials and the operation of the pusher apparatus 23 to move the materials into the tank-furnace 20.

As the materials are discharged into and remain in the dog-house 27 until moved therefrom by the pusher apparatus, they provide an effective barrier across the lower margin of the cooler 28 to further close-off the aperture or dog-house arch 26.

The limit switches 116 to 121, inclusive, are connected to one source line 128 of electrical energy through a manual control switch 129 when the movable contactor 130 is engaging contact 131. Contact 131 is connected by supply line 132 to the several limit switches. On the other hand, contact 133 of switch 129 is connected by line 134 to a plurality of manually operable switches which will be more fully described hereinafter. And, although no provision is herein specifically made, conventional circuit arrangements may be employed, without departing from the spirit of the invention, to impose independent, direct manual control over any one of the elements here involved; as for example, the chute 21, chute 22, pusher apparatus 23 or the cooler 28, without resorting to a similar form of manual control being imposed over the rest. The switch 129 thus provides generally for the automatic or manual operation of the batch feeding functions and when the movable contactor 130 is in engagement with the contact 131, the line 132 will carry electrical energy to the appropriate automatically controlled devices.

In one preferred sequence of operation, discharge for subsequent tank feeding is made from the chutes 21 and 22 into the dog-house 27 as the pusher apparatus 23 completes its return movement and during the interval of the desired timed period. Accordingly, during the return travel of the conveyor 42 and cam 115 thereon, in a previous cycle, the switch 120 will be actuated to re-set the time cycle of the Cullet relay 125 and Batch relay 126, and immediately subsequent, the switch 119 will be actuated to re-set the Pusher timing relay 127 for a similar timed period when it is activated by the Clock relay 124. The normal supply of electrical energy to these relays 124 to 127, inclusive, is by way of source line 128, supply line 135 to the several relays and thence by line 136 to the opposite source 137.

Assuming that the Clock relay 124 has been properly activated and has completed its function, a circuit therethrough will be completed from supply line 135, relay 124, and line 138 to a double-action solenoid-type switch 139 which controls operation of the cooler 28; by branch line 140 to the Pusher relay 127 which controls one side of a double-action solenoid type switch 141 and by branch line 142 to an auxiliary timing relay 143. This general operation of the relay 124 will thus effect raising of the cooler 28; establish certain of the service circuits to the roll-motor 53 and impose a resistance in a further motor circuit to initially reduce the speed of the same.

The switch 139 has an armature 144 which is alternately caused to move in opposite directions by means of coils 145 and 146, the line 138 being connected to one side of coil 145. The armature 144 carries contactor 147, one end of which is attached by line 148 to supply line 135 while the other end is adapted to engage contacts 149 and 150, alternately. The contact 149 is connected by line 151 to one terminal of a solenoid-actuated valve 152 while contact 150 is connected to a second side of said valve by line 153, a return therefrom being generally by way of lines 154 and 136 to source 137.

The valve 152 is adapted to effect the raising of the cooler 28 preliminary to movement of the batch material through the dog-house arch 26 by the rabble or blade 67 of the apparatus 23. For this purpose, the valve has communication by pipes 155 and 156 with pressure and exhaust pipes 157 and 158 respectively, and with a cylinder 159 by pipe 160 to the top and pipe 161 to the bottom thereof. Thus when a circuit from the source 128 is completed by line 135 through the relay 124 and line 138 to coil 145 of switch 139 and by lines 162, 154 and 136 to opposite source 137, said coil will move the armature 144 to swing the contactor 147 to establish a circuit for valve 152 from supply line 135, line 148, contacts 147 and 150, line 153 and lines 154 and 136 to opposite source 137. This will cause the valve to reverse the pressure and exhaust connections between pipes 155, 161, and 156, 160 so that pressure will now be directed to the top of cylinder 159 by pipe 160 from pipes 155 and 157 and exhaust from the bottom thereof will be conveyed by pipe 161 to pipes 156 and 158.

The piston 163 is now moved to retract the piston rod 164 into cylinder 159 and, in a broad sense, lift the cooler 28 to open the area of the dog-house arch 26. More specifically, the cooler 28 and rod 164 are interconnected by a series of winding drums that are mounted on a shaft 165 which is suitably journaled in bearings 166. The drums 167, 168 and 169 have cables associated therewith in a windlass arrangement wherein the cable 170, attached to piston rod 164 and being unwound from the drum 167, and thereby rotating said drum and the shaft 165 will rotate the drums 168 and 169 to wind the cables 171 and 172 thereon, said cables being connected to the cooler 28. Thus when the piston rod 164 is moved inwardly with respect to the cylinder 159, it will act upon the drum 167 through cable 170 to effect rotation of the shaft 165 to the end that the drums 168 and 169 will be rotated to wind up their respective cables and lift the cooler 28 in advance of movement of the blade 67 through the dog-house arch 24.

The piston rod 164 also carries a switch actuator bar 173 near the outer end thereof. This bar is adapted, at the termination of inward movement of the rod 164, to engage and operate a switch 174.

The double contact switch 174, having pairs of fixed contacts 175 and 176, is equipped with a movable contactor 177 that is biased in one position to engage the contacts 175 by a compression spring 178. This switch, which will be more fully hereinafter described, serves as a safety control and the contacts 176 and 177 are only engaged when the cooler 28 has been fully raised to open the dog-house arch 26. In the event that the cooler 28 is not raised so that the blade 67 can be moved freely therebeneath, the contacts 175 and 177 will remain engaged and a necessary holding circuit through contacts 176 will not be established.

Simultaneously with the raising of the cooler 28, the service circuits to the motor 53 are completed and a resistance is imposed on said circuits to permit a slow start of the conveyor 42 and consequent prevention of any overload through the motor.

Two of the necessary three line circuits of the motor 53 are completed by leads 179 and 180 through the roll-type contacts 60 and 61 which engage the conductor rods or bus bars 57 and 58 while the third side from a 220 v. power supply line is indicated at 181. This side of the motor circuit is conventionally supplied to the motor through the tram-rail 45. The bars 57 and 58 are connected by lines 182 and 183 through suitable switches to the other sides 184 and 185 of the 220 v. supply source.

As herein provided, for purposes of illustration, the lines 182 and 183 are so connected through the switch 141 that, during its functioning in one direction, electrical energy will be directed from the said sources 184 and 185 to the lines 182 and 183 while a second switch 186 is adapted to alternately change the flow direction of this energy and thereby change the phase relation in the motor 53. Thus forward motion of the conveyor 42 will be started by the Clock timing relay 124; it will be maintained by the relay 127 and the contacts 176 and 177 of switch 174; its rearward motion will be initiated by the limit switch 121 and this rearward motion will be halted by the limit switch 116.

For this purpose, the line 182 from rod 57 ends at one of the fixed contacts 187 of switch 141 and the opposite contact 187 is connected by line 188 to one of fixed contacts 189 of switch 186. The opposite contact 189 is connected by line 190 to the 220 v. source 184. A branch 191 leads from line 188 to one of fixed contacts 192 of switch 186 while the opposite contact is attached by line 193 to the source 185. Likewise, line 183 from rod 58 ends at one of fixed contacts 194 of switch 141 and the opposite contact 194 is connected by line 195 to one of fixed contacts 196 of switch 186. The opposite contact 196 is connected by line 197 to line 193 and the source 185. A branch 198 leads from line 195 to one of fixed contacts 199 of switch 186 while the opposite contact 199 connects by line 200 to line 190 and source 184.

The switch 141 is in the nature of a double-action solenoid-type switch and the armature 201 thereof, which carries contactors 202, 203 and 204, is caused to move in one direction upon energization of a coil 205 and in the opposite direction upon activation of a coil 206. The switch 186, on the other hand, may be of the single-action spring-loaded type so that the armature 207, carrying contactors 208, 209 and 210 will be moved by the coil 211 against the bias of the spring 212. Normally the spring 212 will effect positioning of the armature 207 so that contactor 208 will engage contacts 189; contactor 209 will engage contacts 196 and contactor 210 will engage contacts 213.

When a circuit is thus temporarily created by activation of the Pusher timing relay 127, it will be completed from source 128 and by line 135 and 214 to the coil 205 of switch 141 which will become energized, completion being by lines 215, 154 and 136 to the opposite electrical source 137. The armature 201 thereupon causes engagement of the contactor 202 with contacts 187; the contactor 203 with contacts 194 and contactor 204 with contacts 216. One side of the contacts 216 connects by line 217 to supply line 135 while the opposite side connects to one side of contacts 218 of switch 186 by line 219; however, no circuit is created since the contactor 210 of switch 186 is separated therefrom.

Likewise, with the energization of the coil 205 of switch 141, by the Pusher relay 127, a circuit will be carried by lead 220 from line 214 to a cooler timing relay 221. This timing relay is adapted to complete a circuit therethrough from line 135, line 222, contacts 175 and 177 of switch 174 and line 223 to coil 206 of switch 141. The predetermined setting of this relay, however, is adjusted only to overlap the active interval of the relay 127 and closure of the contacts 176 and 177 of switch 174. By line 224, the line 223 may also be extended to certain of the timing relays, such as the Resistance relay 143, the Cooler relay 221 and a "Delay" timing relay 225, to re-set these relays for subsequent functioning.

One circuit is thus made from 220 v. source 184 by line 190, contacts 189 and 208, line 188, contacts 187 and 202 and line 182 to rod 57, contacts 60 and lead 179 to motor 53. A second circuit to motor 53 from source 185 is by line 197, contacts 196 and 209, line 195, contacts 194 and 203 and line 183 to rod 58, contacts 61 and lead 180. The third line circuit is, as previously noted, by way of line 181 to the tram-rail 45.

The line 142 from Clock relay 124 causes the Resistance timing relay 143 to actuate a spring-biased solenoid switch 226 and thereby impose a resistance in the line 181 to reduce the speed of the motor 53 during the early stage of forward motion of the conveyor 42 and pusher tool 43. The coil 227 of switch 226 is connected by line 228 to the timing relay 143 and is connected by lines 229, 162, 154 and 136 to the source supply line 137. The switch 226 has an armature 230 and movable contactor 231 carried thereby. The contactor 231 alternately engages contacts 232 and 233, the contact 232 normally completing the line 181 by branch 234 to the motor. The contact 233 is conected by line 235 to an adjustable resistance 236 and by lines 237, 234 to the motor 53. Thus when the relay 124 activates the relay 143 by line 142, its functioning will complete a circuit by line 228 to coil 227 and lines 229, 162 and 154 to the opposite side 137.

When the armature 230 is moved against the compressive action of spring 239, the contactor 231 will be moved from the contact 232 to contact 233 to reduce the service supply to the motor 53. However, when the relay 143 ceases to function, the spring 239 will restore the connection of line 181 between contacts 231 and 232 and consequently increase the current flow to motor 53.

As the conveyor 42 begins its forward travel, the cam 115 moves from engagement with the lever of switch 116, allowing it to open the contacts 240 and close oppositely disposed contacts 241. The contacts 241 partially complete the circuit of contacts 242 of limit switch 121 between line 243 and line 244 to the coil 211 of the switch 186. This circuit eventually is completed upon closure of the contacts 242 of limit switch 121 to effect actuation of the switch 186, reversal of certain circuits therethrough and creation of further circuit, as will hereinafter be more fully described.

The cam 115 then engages the lever of switch 117 and produces closure of the contacts 245 thereof. One side of contacts 245 is attached by lead 246 to line 132 from supply source 128 through switch 129 while the other contact 245 extends the circuit by line 247 to the Clock timing relay 124. The relay is thereby both re-set and again activated to establish the next sequential cycle of operation after an interval of time as predetermined by the setting of the relay.

As previously noted, the bar 173 on piston rod 164, as said rod moves inwardly of the cylinder 159, will operate to open contacts 175 and 176 and close a circuit through contacts 176 and 177 against spring 178. During normal movement of the piston rod 164 to raise the cooler 28, the contacts 176 and 177 of switch 174 will complete a circuit from supply line 132, line 248, contacts 249 of limit switch 121, line 250, contacts 210 and 213 of switch 186, line 251, contacts 176 and 177 of switch 174 and thence by line 252 to line 214 from the Pusher relay 127 to the coil 205. Accordingly, when said Pusher relay 127 ceases to function, a holding circuit for the coil 205 will be maintained at contacts 176 and 177 of switch 174 during forward travel of the conveyor 42.

In the event of failure on the part of the piston 163 in cylinder 159 to move the rod 164 so as to raise the cooler 28, the bar 173 will not be moved to open the contacts 175 and 177 or to close the contacts 176 and 177. Now, if the contacts 176 and 177 are not engaged, the circuit to coil 205 will be rendered inactive upon termination of the timing cycle of the relay 127 but the armature 201 of switch 141 will remain positioned to hold the contactors 202, 203 and 204 engaged with their respective fixed contacts 187, 194 and 216. However, the circuit established by the Cooler timing relay 221 when the same becomes active will be completed at contacts 175 and 177 of switch 174 between lines 222 and 223 to energize the coil 206 of switch 141. The armature 201 will now be moved to disengage the contactors 202, 203 and 204 thereby opening the service lines 182 and 183 to the motor 53. This will stop movement of the conveyor 42 before the pusher blade 67 carried thereon can strike the cooler 28 which has not been properly raised from its lower position across the dog-house arch 26.

As previously noted, movement of the conveyor 42 in a forward direction will carry the cam 115 past each of the limit switches 118, 119 and 120 without effecting their operation.

The conveyor 42 also, through the shaft 75 carried by the pusher bar 43, effects operation of the track gate 84 which alternately opens communication between the divergent arm sections 82 and 83 from the straight or leg section 80 of the track section 78. This gate is mounted on shaft 85 which carries at its lower end the lever 88 that is attached to the armature 89 of the solenoid coil 90. As herein diagrammatically shown, this conventional ratchet switch 94 comprises pairs of circularly arranged fixed contacts 253 and 254 that are alternately engaged by the movably rotatable contactor 255 on the shaft 97. One or the pair of contacts 253 is connected by line 256 to the supply side 128 by line 135 while the opposed contacts 254 are connected by line 257 to the coil 90.

Thus, when the lever 95 is swung by the rod 75 to rotate the contactor 255 of switch 94 into engagement with either of the pair of contacts 253 and 254, a circuit will be completed by lines 135 and 256, contacts 253, 254 and 255, line 257, coil 90 and lines 258, 162, 154 and 136 to opposite source 137. On the other hand, during an ensuing cycle of operation, the lever 95 will be swung to rotate the contactor 255 out of engagement with the pairs of fixed contacts and thereby de-energize the coil 90. Therefore, when the contactor has been rotated from a position, as diagrammatically illustrated, the coil 90 will become inactive. This will permit the spring 96 to eject the armature 89 and, by the lever 88, swing the shaft 85 and gate 84 thereby opening a passage between the straight track section 80 and the divergent arm section 83.

Figure 13:
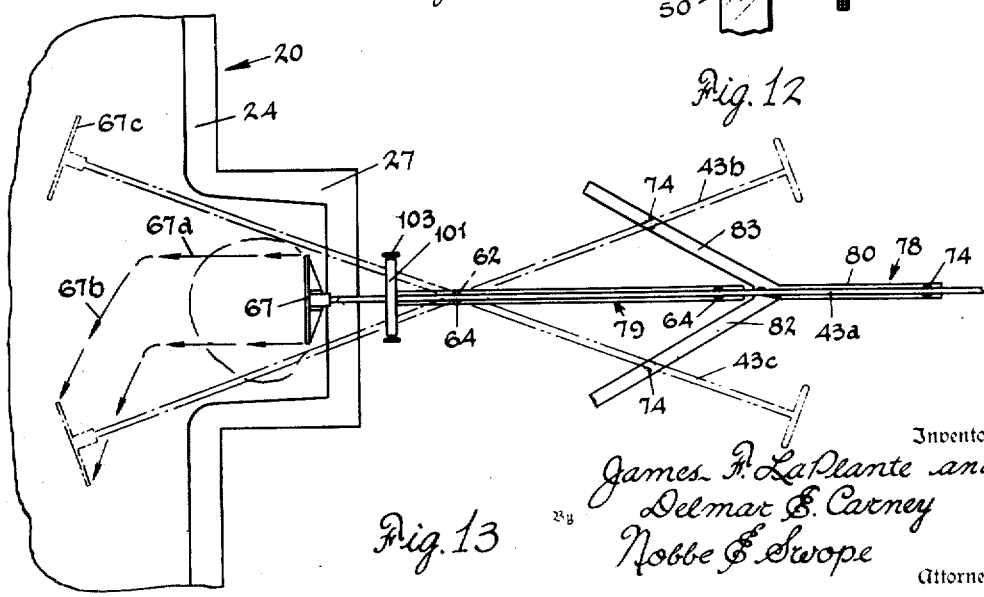
Fig. 13 is a diagrammatic view of the glass tank furnace and the glass batch pushing apparatus illustrating the sequential movements.

Referring briefly to Fig. 13, it will be seen that the pusher bar 43, in moving forwardly from the full line position 43a, will carry the blade 67 in a straightaway path 67a, into the tank-furnace 20 while the roller 74 is traversing the leg 80 of the track section 78; however, as the roller 74 passes the gate 84, it will be directed into the track arm section 83 and will be therein directed so as to swing the bar 43 about the vertical axis of shaft 62 with a consequent arcuate sweeping motion of the blade 67 as is indicated by arrows 67b. This course of motion will continue until the bar 43 substantially reaches a position as is indicated in broken lines 43b and the propelled batch materials will have been pushed into the tank and toward one side thereof. At this point of operation, the cam 115 on conveyor 42 engages the lever of switch 121.

The switch 121 now will momentarily open the circuit at contacts 249 between lines 248 and 250 and complete a circuit by line 259 from supply line 132 from source 128, contacts 242, line 243, contacts 241 of switch 116, line 244 to the coil 211 of switch 186 and by branch 260 to the Delay timing relay 225 which is adapted to impose an interval of delay between the forward and rearward travel of the conveyor 42. The service line 262 of the Delay relay 225 connects the control side of relay 225 to the coil 264 of a normally closed, double-contactor switch 265 in the service lines 184 and 185. The circuit of coil 264 is completed to the source 137 by lines 266, 162 and 154, and when energized, said coil will move the armature 267 against spring 268 so that the contactors 269 and 270 are separated from the contacts 271 and 272 thereby opening lines 184 and 185 to lines 190 and 193. Line 273 completes the circuit of coil 211 by lines 154 and 136 to source 137. When coil 211 is energized, the armature 207 will be moved against spring 212 to open circuits between movable contact 208 and contacts 189, between movable contact 209 and contacts 196, movable contact 210 and contacts 213 and close a circuit between fixed contacts 218 and movable contact 210. The armature will also establish two circuits by closure of contact 208 with contacts 192 and of contactor 209 with contacts 199. Since contacts 192 are connected by line 193 to 220 v. source 185 and through lines 191 and 188, contacts 187 and 202 to line 182 and rod 57 and since contacts 199 are connected by line 200 to the 220 v. source 184 and through lines 198 and 195, contacts 194 and 203 with line 183 and rod 58, the phase relationship within motor 53 will be changed. Upon cessation of functioning of the timing relay 225, the coil 264 of switch 265 will become de energized and the spring 268 will move the armature 267 to restore the lines 184 and 185 through contacts 269, 271 and 270, 272 of switch 265. This will again complete the service circuits of the motor 53 through the switches 141 and 186 and the conveyor 42 will begin to move rearwardly.

When the contactors 208 and 209 engage contacts 192 and 199, respectively, the contactor 210 will engage contacts 218 to establish a circuit from source 128 by lines 135 and 217, contacts 204 and 216 and line 219 to line 274 leading to line 243 attached to contacts 242 of switch 121. Thus when the lever of switch 121 is released by cam 115, and the circuit between lines 259 and 243 is opened, a maintaining or holding circuit for coil 211 will be made from line 274, line 243, contacts 241 of switch 116 and line 244 to the coil. The coil 211 will accordingly remain energized during rearward movement of the conveyor 42.

Also when contacts 210 and 213 of switch 186 are disengaged, the circuit between lines 250 and 251 will be opened. This will further open the line circuit from supply 132 by way of lines 250 and 251 to contacts 176 and 177 of switch 174 to the coil 205 of switch 142. Thus when the limit switch 121 returns to close contacts 249, the circuit of lines 250 and 251 at contacts 210 and 213 will not be restored.

The cam 115 now is brought into active engagement with the lever of limit switch 120 to effect closure of the contacts 275 and complete a circuit by line 276 from supply line 132, line 277 to the Cullet timing relay 125 and Batch timing relay 126 which will operate to re-set the timing elements thereof to initiate a subsequent cycle therein when said relays are activated. The cam 115 then acts to close the contacts 278 of limit switch 119 and create a circuit from supply line 132, line 279 and line 280 to the Pusher timing relay 127, thence by line 136 to the opposite source 137. The relay 127, as previously noted, will predeterminedly set up a timed interval when it has been activated by the Clock relay 124 to initiate operation of the motor 53 thereby producing subsequent travel of the conveyor 42.

Upon engagement of the lever of limit switch 118 by cam 115, a circuit from supply line 132, line 281, contacts 282 of said switch, line 283 to coil 146 of switch 139 with a return by lines 284, 162, 154 and 136 to opposite source 137. The coil 146 causes the armature 144 to carry the contactor 147 from contact 150 to contact 149. The creates a circuit to the opposite side of valve 152 by lines 148 and 135 from source 128, contacts 147 and 149, line 151 to the valve and thence by lines 154 and 136 to opposite source 137. The valve, when again activated, reverses the pneumatic communications from pipes 157 and 158 so that pressure will be directed to the lower end of cylinder 159 by pipe 161 and exhausted from the top by pipe 160. As the piston 163 moves the rod 164 outwardly, the cooler 28 will act to unwind the cables 171 and 172 from the drums 168 and 169 on shaft 165 with a consequent rewinding of cable 170 onto drum 167. The cooler 28 will thus resume its position of closure across the open area of the dog-house arch 26 after the blade 67 has been withdrawn from the interior of the tank. Also when the piston rod 163 is moved outwardly, the actuator bar 173 will be disengaged from the switch 174 thereby allowing the spring 178 to open contacts 176 and 177 and close contacts 175 and 177. The circuit through these contacts has been opened, however, at the timing relay 221 between lines 222 and 223. The emergency circuit of coil 206 will accordingly not be restored at contacts 175 and 177 nor will the holding circuit of coil 205 be re established.

Also, by branch 285 from line 283, closure of limit switch 118 will complete a circuit from supply line 132 to the functioning side of Cullet relay 125 whereupon it will initiate a timed interval during which cullet will be discharged from the chute 21. Continuing, and as the cam 115 passes the various limit switches, the shaft 75 on pusher bar 43 passes the lever 95 and switch 94, however, the lever 95 being carried to its idle position 95b (Fig. 4), the switch 94 is not actuated during return movement of the conveyor 42 or the pusher bar 43 carried thereby.

Upon engaging the lever of switch 116, the cam 115 effects opening of the contacts 241 and closure of contacts 240. The circuit between lines 243 and 244 is thereby opened to de-energize coil 211 of switch 186 and the spring 212 will move the armature 207 to open the circuits of lines 191 and 193 at contacts 192 and 208; lines 198 and 200 at contacts 199 and 209, lines 219 and 275 at contacts 210 and 218 and close the circuit of lines 250 and 251 at contacts 210 and 213. Simultaneously contacts 189 and 208 will restore connection between lines 188 and 190 and contacts 196 and 209 will restore circuit between lines 195 and 197.

When the contacts 240 of limit switch 116 are again closed, a circuit is established from supply 132 to line 314 and 223 extending to coil 206 of switch 141 and by lines 315, 154 and 136 to the source 137. The coil 206 operates, by movement of the armature 201, to open all circuits through switch 141 by movement of the contactors 202, 203 and 204 from the respective contacts 187, 194 and 216. Upon opening of the circuits at contacts 187 and 194, the service circuits of lines 182 and 183 to motor 53 will be opened and rearward movement of the conveyor 42 halted.

Assuming now that the Cullet timing relay 125 has functioned for its timed interval, a circuit therethrough will be completed from electrical current supply side 128, line 135, relay 125, line 286 to a self-reversing solenoid-type valve 287 and through lines 288, 154 and 136 to the opposite supply side 137. The valve 287 is connected by pipe 289 to a source of pneumatic pressure 157 and by pipe 290 to a suitable exhaust 158 therefor. Valve 287 is also connected by pipe 291 to the upper end of cylinder 292 and by pipe 293 to the lower end thereof. The cylinder 292 is pivotally hung on a pin 294 mounted in a bracket 295 that may be secured to the understructure channels 32 of the platform 29. The cylinder 292 is equipped with a piston 296, the rod 297 of which is pivotally connected to a lever 298 mounted on one of the shafts 41 of the gate 39 for the chute 21, normally closing the lower end thereof.

An actuating circuit being made to the valve 287, it is caused to change the connections therethrough as shown, and so that the pressure from pipe 157 will be directed by pipe 291 to the top of cylinder 292 while the bottom thereof is connected to the exhaust 158 by pipe 293. Thereupon the piston 296 will move the piston rod 297 outwardly and, by the lever 298, swing the gate 39 so as to open the chute 21 thereby discharging the required amount of cullet glass into the dog-house 27. This required amount is not actually determined by actively weighing but more especially is determined by the predetermined period for which the timing relay 125 is set to function.

When the relay 125 becomes inactive, the valve 287 will automatically reverse the pressure and exhaust connections therethrough so that pressure by pipe 157 will again be directed through pipe 293 to the lower end of cylinder 292 to move the rod 297 inwardly by the piston 296. This will operate to return the gate 39 across the end of the chute 21. And, as the piston rod 297 moves toward the end of its inward stroke, a bar 299 carried therein passes and causes the momentary closure of a switch 300 which completes a circuit at its contacts 301 between supply line 135 and a line 302 to the Batch timing relay 126.

When the Batch timing relay 126 is activated, it will complete a circuit from current supply line 135 and line 303 to a similar self-reversible solenoid-type valve 304 and by lines 305, 154 and 136 to the opposite side 137 of the electrical source. Valve 304 is connected by pipe 306 to pressure pipe 157; by pipe 307 to the exhaust 158; by pipe 308 to the top of cylinder 309 and by pipe 310 to the lower end of said cylinder. The cylinder 309, as in the case of cylinder 292, is pivotally hung on a pin 294 in a bracket 295 secured to the channels 32 of the platform 29.

When the valve 304 is actuated, connections therethrough are established between pipes 157, 306, and 308 as well as to exhaust pipe 158 through pipes 307 and 310. The piston 311 of cylinder 309 accordingly is operated to move the rod 312 thereof outwardly and, by lever 313, associated with the gate 40, effect opening of the chute 22. The required amount of raw batch material will now be discharged from the chute 22 to complete the amount of batch to be supplied to the glass tank.

Since the amount of raw batch material, as in the case of the cullet is not dependent upon a weight determination of the quantity in the chute 22 but upon the active period of the timing relay 126, its lapse into inaction will allow the valve 304 to automatically reverse thereby again directing pressure to the lower end of cylinder 309 through pipes 306 and 310 and exhausting the upper end thereof through pipes 308 and 307. As the piston rod 312 is retracted, it will return the gate 40 to its position of closure across the end of the chute 22 by lever 313.

Upon termination of cyclic operation of the Clock timing relay 124 through its timed interval, the above sequence of events will be repeated. Namely, the Clock timing relay 124 will cause the cooler 28 to be raised, energization of coil 205 of switch 141 to actuate the armature 201 and close the above described circuits through contacts 187 and 202, 194 and 203, 204 and 216, and temporarily impose an impedance upon the current flow to the motor 53 through resistance 236.

In moving forwardly, the cam 115 on conveyor 42 will be disengaged from the lever of limit switch 116 allowing the circuit of contacts 240 to open and the circuit through contacts 241 to be re-established. Then the cam engages the lever of limit switch 117 to complete the circuit from supply line 132 to line 247 and the Clock timing relay 124. Energization of relay 124 to re-set and again activate its timing cycle also effects operation of the coil 145 of switch 139 thereby causing the armature 144 to carry the contactor 147 from contact 149 to 150 to complete the circuit of valve 152 whereby the said valve will operate to raise the cooler 28 by the cylinder 159.

Then, as the shaft 75 engages the lever 95, the shaft 97 will rotate the contactor 255 of switch 94 to complete a circuit from supply line 132, line 256, contacts 253, 254 and 255, line 257, coil 90 and lines 258 and 136 to the opposite source 137. The armature 89 will accordingly be retracted against spring 96 and the gate 84 will be swung to open the passage from the straight track section 80 into the arm section 82. The pusher bar 43 will thus be carried in a straightaway course until the roller 74 enters the track section 82, when the bar will be swung until it ultimately reaches a position substantially as shown at 43c in Fig. 13 and the blade 67 will have pushed the batch materials toward the opposite side of the glass tank as indicated at 67c.

Further, forward progress of the conveyor 42 will carry the cam 115 sequentially past the limit switches 118, 119 and 120 without actuation thereof and, until the limit switch 121 is engaged to change the phase relation within the motor 53 and cause the conveyor 42 to move rearwardly. Thereupon the cam engages the switches 120, 119 and 118 to produce their designated functions and eventually engages the switch 116 to gain open the motor circuits at the switch 141 and halt the rearward progress of the conveyor.

In the event that the limit switches do not properly function and, in an emergency, a manual control must be imposed upon the cyclic operation of the batch pushing apparatus 23, the contactor 130 of switch 129 is moved to establish a circuit from the source line 128, contacts 130 and 133 and line 134. The line constitutes a supply for a series of manually operable switches 316, 317, 318, 319, 320 and 321.

The switch 316 has two movable contact members 322 and 323, the contact member 322 completing a bridge circuit from the supply line 134, contact 324 and by line 325 to line 250 while contact member 323 is adapted to complete a similar circuit, when engaging contact 326, between lines 134 and 327. The contacts 322 and 324 thus replace contacts 249 of limit switch 121 while contacts 323 and 326 replace contacts 242 of said switch.

The switch 317, by line 328, will connect supply line 134 with line 277 to the relay 125 thereby replacing limit switch 120. The switch 318 will likewise connect supply line 134 by line 329 to line 280 extending to the relay 127 and replacing limit switch 119. Switches 319 and 320 by lines 330 and 331 respectively will connect supply line 134 to related lines 283, 285 and line 247 thereby substituting a manual control for limit switches 118 and 117 which control the operation of coil 146 of switch 139 and the Clock relay 124.

The switch 321, like switch 316, differs from the other manual switches 317 and 320, inclusive, in that it is provided with two contactor members 332 and 333. The contact member 333, in one position of the switch, affords a parallel or shunt circuit for lines 243 and 244 and bridging the circuit of these lines through the contacts 241 of switch 116. The contacts 333 and 334 thus complete the shunt line 335 extending from line 243 around said contacts 241 to line 244. When the switch per se is manually moved to a second position, this shunt circuit will be opened while the contactor 332 will engage contact 336 to complete a circuit from supply line 134 by line 337 to line 314 thereby replacing contacts 240 of limit switch 116 and placing action of coil 206 of switch 141 under the control of contacts 332 and 336 of switch 321. When automatic operation is to be resumed, the contactor 130 of switch 129 is removed from contact 133 to contact 131 thereby restoring the connection between lines 128 and 132 and rendering manually operable switches 316 to 321, inclusive, ineffectual.

Summarizing the operation of the pusher apparatus 23 briefly, the conveyor 42 begins to travel forwardly on the tramrail 45 upon termination of the timed interval of the Clock relay 124. Initially, the conveyor's movement is slow, by reason of the resistance 236 imposed in the circuit of the motor 53, and, as the blade 67 is moved against the batch materials in the dog-house 27, the cooler 28 is raised by the operation of valve 152 and cylinder 159. The speed of the conveyor motor then increases and the blade is urged against the batch materials to direct them into the interior of the tank-furnace 20. In moving forwardly, the pusher bar 43 carries the shaft 75 into momentary engagement with the lever 95 thereby causing the switch 94 to be actuated to energize or alternatively de-energize the coil 90. According to the preceding circumstances of operation, the gate 84 will now be operated to open communication between the straight section 80 and one or the other of the divergently disposed sections 82 and 83 of the track section 78 and the roller 74 will follow in its directed course to produce a swinging motion of the pusher bar 43. This will direct the batch materials in alternate sequences of operation toward one or the other side of the tank-surface.

At the inner limit of travel of the conveyor 42, the switch 265 will cause a temporary pause or delay between the forward and rearward movement thereof. The motor 53 then carries the conveyor rearwardly. Now, as the blade 67 is withdrawn from the tank-furnace, it will be moved according to the return movement of the roller 74 from a divergent track section to the straight track section 80. When the blade has been carried outwardly beyond the arch 26, the cooler 28 is lowered. The Cullet relay 125 and Batch relay 126 now effect discharge of another quantity of batch material which enters the dog-house 27 and against the cooler to further shut off the dog-house arch from egress of heat therefrom. Shortly thereafter the conveyor 42 arrives at the end of its outer travel and, through the above-described switch controls, the service circuits to the motor 53 are opened. Thus, as the pusher apparatus 23 comes to a halt, the only functioning element is the Clock timing relay 124 which will eventually initiate forward movement of the conveyor 42 in a subsequent cycle.

According to the disclosed novel features of this invention, it now becomes possible to accurately spread the added batch materials across substantially the entire width of the glass tank-furnace and in a more evenly distributed mass. This distributes the batch materials over a greater surface area of the molten glass and subjects them more easily and rapidly to the heat of the tank-furnace. Also, since the materials are introduced into the tank-furnace at shorter intervals and in smaller amounts than heretofore, the tendency for the materials to lump or produce a surging of the molten glass is materially reduced if not eliminated. This not only permits a better control of glass level maintenance but assures a rapid assimilation and reduction of the batch materials into the body of molten glass.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. In apparatus for feeding sucessive charges of batch into a melting tank containing a molten bath, a pusher positioned to engage a charge of batch when deposited on said bath, means for repeatedly moving said pusher forwardly a predetermined distance into said tank and then retracting it to its original position, and a plurality of angular deflecting means interconnected at the same point for alternately deflecting said pusher angularly on opposite sides of the path of said moving means for said pusher.

2. In apparatus for feeding successive charges of batch into a melting tank containing a molten bath, means for periodically depositing a charge of batch on said bath, a pusher normally located rearwardly of said batch charge and in position to engage the same, means operating in timed relation to said batch depositing means for repeatedly moving said pusher forwardly a predetermined distance into said tank and then retracting it to its original position, and means for guiding said pusher laterally during movement thereof, said last-named means including Y-shaped means along which a portion of said pusher is adapted to be guided.

3. In apparatus for feeding successive charges of batch into a melting tank containing a molten bath, a batch pusher comprising an elongated member having a pusher blade at one end thereof, a carriage mounted for movement along a straight path toward and away from said tank, means pivotally mounting said elongated member intermediate its ends for swinging movement on said carriage, means for repeatedly driving the carriage toward and away from said tank, and means for guiding said batch pusher during movement thereof, said last-named means including Y-shaped means along which said elongated member is adapted to be guided so as to swing said pusher blade laterally in an arc during movement of said carriage.

4. In apparatus for feeding successive charges of batch into a melting tank containing a molten bath, a batch pusher comprising an elongated member having a pusher blade at one end thereof, a carriage mounted for movement along a straight path toward and away from said tank, means pivotally mounting said elongated member intermediate its ends for swinging movement on said carriage, means for repeatedly driving the carriage toward and away from said tank, a substantially Y-shaped track, and means associated with the end of said elongated member opposite said pusher blade and in engagement with said track for controlling lateral movement of the ends of said elongated member during movement of said carriage.

5. In apparatus for feeding successive charges of batch into a melting tank containing a molten bath, a batch pusher comprising an elongated member having a pusher blade at one end thereof, a carriage mounted for movement along a straight path toward and away from said tank, means pivotally mounting said elongated member intermediate its ends for swinging movement on said carriage, means for repeatedly driving the carriage toward and away from said tank, a substantially Y-shaped track, means associated with the end of said elongated member opposite said pusher blade and in engagement with said track for controlling lateral movement of the ends of said elongated member during movement of said carriage, and means associated with said track for directing said lateral movement controlling means along one leg of said Y during one forward movement of said carriage and along the other leg of said Y during the next forward movement of said carriage.

6. In batch pushing apparatus of the character described, the combination with a glass tank-furnace of a batch pushing tool, a pushing blade pivotally attached to one end of the pushing tool for moving the batch materials into the tank-furnace, a conveyor for the batch pushing tool, means mounting said pushing tool on said conveyor for swinging movement relative thereto, means for movably supporting the conveyor for movement toward and away from the tank-furnace, a guide track having a straight section, a second guide track having a Y-shaped section composed of a straight section and divergently arranged sections, rotatable means associated with the conveyor adapted to follow the straight section of guide track, a second rotatable means associated with the pushing tool adapted to follow the Y-shaped section of said second guide track, means for periodically producing operation of the conveyor toward the tank-furnace and means guiding the second-named rotatable means into the divergent sections of the Y-shaped guide track to direct the pusher blade of the said pushing tool laterally toward one side or the other of the tank furnace when the pushing tool is being moved inwardly thereof.

7. In batch pushing apparatus of the character described, the combination with a glass tank-furnace of a batch pushing tool, a pushing blade pivotally attached to one end of the pushing tool for moving the batch materials into the tank-furnace, a conveyor for the batch pushing tool, means mounting said pushing tool on said conveyor for movement relative thereto, means for movably supporting the conveyor for movement toward and away from the tank furnace, a guide track having a straight section, a second guide track having Y-shaped sections composed of a straight section and divergently arranged sections, means associated with the conveyor adapted to follow the straight section of guide track, a second means associated with the pushing tool adapted to follow the Y-shaped section of said second guide track, means for periodically discharging batch materials into the tank-furnace, means for periodically producing operation of the conveyor toward the tank-furnace, and means operable by the said conveyor for initiating a subsequent periodic discharge of batch materials when said conveyor is moving away from the tank-furnace.

8. In a batch pushing apparatus for supplying a glass tank-furnace, a batch pushing tool, a conveyor for the tool, a conveyor rail horizontally supported by the tank-furnace, means for operatively moving the conveyor along the rail toward and away from the tank-furnace, a vertically disposed shaft journaled on the conveyor for supporting the pushing tool thereon, a roller pivotally mounted on the lower end of said shaft, a guide track aligned with the longitudinal axis of the tank-furnace for guiding the roller and said conveyor, a pushing blade pivotally attached to the forward end of the pushing tool, a vertically disposed shaft affixed to the rear end of the pushing tool, a roller pivotally carried by said second-mentioned shaft, a second guide track having a straight rear section and angularly disposed forward sections for guiding the second-named roller, means to guide the second named roller alternately into one or the other of the angularly disposed forward track sections, and means operable by the pushing tool when it is moving forwardly for moving said guide means to direct the second-named roller from the said straight track section of the second-named guide track into one and then the other angularly disposed sections of the said guide track in alternate sequences.

9. In a batch pushing apparatus for supplying a glass tank-furnace, a batch pushing tool, a power-driven conveyor for said tool, a horizontally supported rail for carrying the conveyor, a vertically disposed shaft journaled on the conveyor for pivotally supporting the pushing tool thereupon, a roller pivotally mounted on the lower end of the shaft, a guide track aligned with the longitudinal aixs of the tank-furnace for guiding the roller and conveyor, a pushing blade pivotally attached to the forward end of the pushing tool, a vertical shaft depending from the rear end of said pushing tool, a roller pivotally carried by the second mentioned shaft, a second guide track having a straight rear section and communicating angularly disposed forward sections for guiding the second-named roller, a gate arranged in the juncture of the angularly disposed sections and adapted to close communication between the straight rear section and one or the other angularly disposed sections of the second-named track, spring means adapted to normally hold the gate across the entrance to one of the said angularly disposed sections, electrical means operable upon energization to swing the gate against the action of said spring and across the entrance of the other angularly disposed section, means on said pusher tool for alternately energizing and de-energizing said electrical means upon alternate forward movements of said tool whereby the second-named roller during its movement along said second mentioned track will move the rear end of the pushing tool angularly and the pushing blade laterally first toward one side and then the other side of the tank-furnace during successive forward movement of said tool.

10. In a batch pushing apparatus for supplying a glass tank-furnace, a batch pushing tool, a power-driven conveyor for said tool, a horizontally supported rail for carrying the conveyor, a vertically disposed shaft journaled on the conveyor for pivotally supporting the pushing tool thereupon, a roller pivotally mounted on the lower end of the shaft, a guide track aligned with the longitudinal axis of the tank-furnace for guiding the roller and conveyor, a pushing blade mounted on the forward end of the pushing tool for pivotal movement in one direction only, a vertical shaft depending from the rear end of said pushing tool, a roller pivotally carried by the second mentioned shaft, a second guide track having a straight rear section and communicating angularly disposed forward sections for guiding the second-named roller, a gate arranged in the juncture of the angularly disposed sections and adapted to close communication between the straight rear section and one or the other angularly disposed sections of the second-named track, a spring adapted to normally hold the gate across the entrance to one of the said angularly disposed sections, electrical means operable to swing the gate against the action of said spring across the entrance to the other of said angularly disposed sections, a switch mounted on the said straight rear section of the second-named guide track, means carried by the pushing tool for operating the switch in "on" and "off" cycles during alternate forward movement thereof, said switch operating the said electrical means to swing the gate across the entrance to one angularly disposed track section during an "on" switch cycle, said spring means returning said gate across the entrance to the other angularly disposed section during an "off" switch cycle thereby causing the pusher blade of the pushing tool to be moved laterally toward one side of the tank-furnace and then toward the opposite side thereof in alternate forward movements of said conveyor.

11. In batch supplying apparatus of the character described, the combination with a glass tank-furnace and chutes for discharging batch material thereto, of a batch pushing tool, a pushing blade pivotally attached to the forward end of the batch pushing tool, a power-driven conveyor for said tool, a horizontally supported rail for carrying the conveyor, a vertically disposed shaft journaled on the conveyor for pivotally supporting the pushing tool substantially midway between the ends thereof, a roller pivotally mounted on the lower end of said shaft, a guide track aligned with the longitudinal axis of the tank-furnace for guiding the roller and conveyor, a vertically disposed shaft affixed to the rear end of the pushing tool, a roller pivotally carried by the second-mentioned shaft, a second guide track having a straight rear section and angularly disposed forward sections for guiding the second-named roller, a pivotally mounted gate connecting the straight rear section to one or the other of the angularly disposed sections, a spring adapted to normally hold the gate in position to connect the straight rear section to one of the angularly disposed sections, electrical means for swinging the gate against the action of said spring to connect the straight rear section to the other of said angularly disposed sections, means operable by the said second-named roller shaft to energize and de-energize said electrical means as the conveyor moves forwardly in alternate forward movements thereof, a timer for periodically causing the conveyor to carry the pushing tool forwardly, switch means positioned to be operated by the conveyor at the end of its forward movement to cause the rearward movement thereof, a second switch means positioned to be operated by said conveyor at the end of its rearward movement for halting the same and means operable by said conveyor during its rearward movement to effect discharge of batch materials from the said chutes.

12. In apparatus for feeding successive charges of batch into a tank, a pusher positioned to engage a charge of batch, means for moving said pusher forwardly a predetermined distance toward said tank and then retracting it, guide means operatively connected with said pusher for guiding said pusher along a plurality of paths, said guide means including a plurality of sections angularly disposed with respect to one another, and means operably connected with said guide means for selectively directing movement of said pusher along said sections.

References Cited in the file of this patent

UNITED STATES PATENTS

| | | |
|---|---|---|
| 1,201,664 | Williams | Oct. 17, 1916 |
| 1,953,221 | Good | Apr. 3, 1934 |

FOREIGN PATENTS

| | | |
|---|---|---|
| 551,945 | Great Britain | Mar. 17, 1943 |

UNITED STATES PATENT OFFICE

CERTIFICATE OF CORRECTION

Patent No. 2,804,981                                                      September 3, 1957

James F. La Plante et al.

It is hereby certified that error appears in the printed specification of the above numbered patent requiring correction and that the said Letters Patent should read as corrected below.

Column 1, line 50, for "character. A" read -- character, a --; column 4, line 74, for "by suitable" read -- of suitable --; column 8, lines 28 and 29, after "interim" insert a comma; column 9, line 62, for "arch 24" read -- arch 26 --; column 14, line 6, for "The" read -- This --; column 16, line 57, for "and 320" read -- to 320 --; column 17, line 23, for "tank-surface" read -- tank-furnace --; column 19, line 60, for "aixs" read -- axis --.

Signed and sealed this 26th day of November 1957.

(SEAL)

Attest:

KARL H. AXLINE
Attesting Officer

ROBERT C. WATSON
Commissioner of Patents